(12) United States Patent
Ferlitsch

(10) Patent No.: US 7,463,380 B2
(45) Date of Patent: Dec. 9, 2008

(54) SPOOLING/DESPOOLING SUBSYSTEM JOB FINGERPRINTING

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1097 days.

(21) Appl. No.: 10/831,482

(22) Filed: Apr. 23, 2004

(65) Prior Publication Data
US 2005/0237557 A1 Oct. 27, 2005

(51) Int. Cl.
*G06K 15/00* (2006.01)
(52) U.S. Cl. .................... 358/1.15; 358/1.13
(58) Field of Classification Search ........... 358/1.15, 358/450, 3.28, 3.23, 3.31, 435, 436, 437, 358/438, 439, 448, 468, 1.13, 1.14, 1.18; 713/1.82, 176
See application file for complete search history.

(56) References Cited

U.S. PATENT DOCUMENTS

| | | | |
|---|---|---|---|
| 6,212,504 B1 | 4/2001 | Hayosh | 705/64 |
| 6,924,826 B1 * | 8/2005 | Nakagiri et al. | 715/700 |
| 7,161,711 B2 * | 1/2007 | Mori et al. | 358/1.9 |
| 7,256,909 B2 * | 8/2007 | Gomi | 358/1.18 |
| 7,265,860 B2 * | 9/2007 | Ferlitsch | 358/1.15 |
| 2001/0054150 A1 | 12/2001 | Levy | 713/176 |
| 2002/0042884 A1 | 4/2002 | Wu et al. | 713/201 |
| 2002/0052897 A1 * | 5/2002 | Nishikawa et al. | 707/527 |
| 2002/0131069 A1 * | 9/2002 | Wanda | 358/1.14 |
| 2003/0007181 A1 * | 1/2003 | Nishikawa et al. | 358/1.18 |
| 2004/0085386 A1 * | 5/2004 | Yamamura | 347/19 |
| 2005/0177739 A1 * | 8/2005 | Ferlitsch et al. | 713/189 |
| 2005/0237557 A1 * | 10/2005 | Ferlitsch | 358/1.13 |
| 2005/0259289 A1 * | 11/2005 | Ferlitsch et al. | 358/1.14 |
| 2006/0274355 A1 * | 12/2006 | Ferlitsch et al. | 358/1.15 |

FOREIGN PATENT DOCUMENTS

| | | |
|---|---|---|
| JP | 2001051915 | 2/2001 |
| WO | WO 91/06068 | 5/1991 |
| WO | WO 00/72247 | 11/2000 |
| WO | WO 01/74053 | 10/2001 |

* cited by examiner

*Primary Examiner*—Jerome Grant, II
(74) *Attorney, Agent, or Firm*—Law Office of Gerald Maliszewski; Gerald Maliszewski

(57) ABSTRACT

A system and method are provided for print job fingerprinting. The method comprises: accepting an electronically formatted document; generating a print job; in a spooling/despooling subsystem, accepting fingerprint information; and, adding a fingerprint image to the print job. That is, a fingerprinted print job is generated. In some aspects, the fingerprint is encrypted. The method further comprises: sending the fingerprinted print job, from the spooling/despooling subsystem, to a printer; and, generating a hardcopy of the document, with the fingerprint image. If the fingerprinted print job is rendered, for example copied, scanned, or converted into a different print job format, the rendered print job still includes the fingerprint image.

38 Claims, 17 Drawing Sheets

Fig. 1A (Prior Art)

PRINTED SHEET

*IMAGE*

*BARCODE*

PRIOR ART

*Fig. 1B (Prior Art)*

PRINTED SHEET

IMAGE

SERIAL NUMBER

PRIOR ART

PRIOR ART

SPOOLING/DESPOOLING SUBSYSTEM JOB FINGERPRINTING

BACKGROUND OF THE INVENTION

1. Field of the Invention

This invention generally relates to digital image processing and, more particularly, to a system and method for fingerprinting a print job.

2. Description of the Related Art

The origin and certain other details associated with the rendered output of a print job, are not conventionally embedded in the print job. Further, even the job characteristics that accompany a print job cannot be extracted, once the print job is printed. Thus, information concerning the origin of the print job, such as the desired anti-copy protection criteria, or the printer identification that produced the output, is lost. If this information is not printed with the document, administrators cannot detect or trace back the misuse of the printing devices, where confidentiality is an issue, or provide forensics information as to the source of a printout, when the document is associated with a crime investigation. The process of providing information about a document, with the document, when the document is rendered into an output, is referred to herein as fingerprinting.

FIG. 1A is a diagram illustrating a barcode fingerprint (prior art). One conventional fingerprinting means is barcoding. In this case, a barcode containing the fingerprint information is added to a part of the printed document in such a way as to not obscure the print image. For example, the barcode may be added to a binding edge, in a portion of the document that is not used for stapling or hole punching. Alternately, the barcode may be added to an unused area of a page footer. The barcode can subsequently be scanned to read the fingerprint information. Barcodes may contain a substantial amount of redundant information, so that they remain reliable, even after copying or rescanning.

FIG. 1B is a diagram depicting a serialized fingerprint (prior art). Another method of fingerprinting is serialization. In this case, a human readable text string containing the fingerprint information is added to a part of the printed output that does not contain the print image; as described for the barcode above. Generally, the text string contains an identifier for each printout that is used to uniquely identify each instance, for example, the serial number of a copy. The serial number can subsequently be read by a human, or scanned/OCR (optical character recognition), to recover the fingerprint information. The serial number fingerprints can be accurately copied with a high reliability.

FIG. 1C is a diagram depicting a watermark fingerprint process (prior art). Another method of fingerprinting is the use of a digital mark added to the printed output. For example, a digital mark may be added as a watermark. This method suffers in that it modifies the print image. If the digital mark is added "beneath" the print image (underlay), portions of the digital mark may be obscured by the print image, resulting in a loss of fingerprint information. If the digital mark is added above the print image (overlay), portions of the print image may be obscured by the digital mark, resulting in a lost of some of the print image. If overlapping parts of the print image and digital mark are merged together (composite), then a trade-off can be performed between the loss of fingerprint information vs. loss of print image. The digital mark can subsequently be recognized by either a human or scan process. Copying of the printed output may result in a deterioration of the fingerprint information.

Other methods of watermarking may include hiding a digital signature in the printed image. In pending patent application Ser. No. 10/617,483, entitled SECURITY FONT SYSTEM AND METHOD FOR GENERATING TRACEABLE PAGES IN AN ELECTRONIC DOCUMENT, invented by Mary Bourret, fingerprint information is embedded by altering the characteristics of a font set.

It would be advantageous if fingerprint information could be added to a print job seamlessly by an element of the spooling or despooling subsystem.

It would be advantageous if the spooling/despooling subsystem adding the fingerprint could be embedded in either a client computer device, print provider, or a print server, in the path between the print generator, such as a print driver, and the printer.

SUMMARY OF THE INVENTION

The present invention solves the above-mentioned problems by imprinting and/or hiding fingerprint information in a print job. The fingerprint may be obtained by monitoring the print job origin information, such as the print source, and/or other valuable information such as if anti-copy protection is desired. Further, information such as print destination may be derived from monitoring the job delivery to a printer for printing.

The fingerprinting method is implemented within the spooling/despooling subsystem. For example, a print processor, port manager (monitor), or spooler can add the fingerprint to a print job. The present invention fingerprint method works independent of the print generation source, or the application sourcing the print generation. Further, the method is independent of the protocol used to transmit the print job to the destination device(s). The method works with conventional printers, regardless of whether they are locally, network, or remotely connected. Information can be collected concerned the intended print job destination. Likewise, the fingerprint method may be implemented at the source origination, so that source origination information is collected. The fingerprint method may be implemented at the print server, whereby routing point information can be collected.

Accordingly, a method is provided for print job fingerprinting. The method comprises: accepting an electronically formatted document; generating a print job; in a spooling/despooling subsystem, accepting fingerprint information; and, adding a fingerprint image to the print job. That is, a fingerprinted print job is generated. In some aspects, the fingerprint is encrypted. The method further comprises: sending the fingerprinted print job, from the spooling/despooling subsystem, to a printer; and, generating a rendered copy of the print job, with the fingerprint image. If the fingerprinted print job is rendered, for example copied, scanned, or converted into a different print job format, the rendered print job still includes the fingerprint image.

The method accepts the fingerprint information in a spooling/despooling subsystem that can be embedded in either a client computing device host, print provider host, or a print server host. As used herein, the spooling/despooling subsystem may include spooler, port manager, print processor, and print assist module components. Any of these components may add the fingerprint to the print job. The type of fingerprint information that may be collected and added includes job ownership/origination, host, target printer, routing, job assembly, job scheduling, metadata, and job content information.

The fingerprint image that is added to the print job may take the form of a barcode, alpha-numeric text, watermark, font set, or steganographic image. The print job to which the fingerprint image is added may be in a machine-dependent raster image data, machine independent bitmap data, or page description language (PDL) format.

Additional details of the above-described method and a print job fingerprinting system are provided below.

BRIEF DESCRIPTION OF THE DRAWINGS

FIG. 1A is a diagram illustrating a barcode fingerprint (prior art).

FIG. 1B is a diagram depicting a serialized fingerprint (prior art).

DETAILED DESCRIPTION
OF THE PREFERRED EMBODIMENTS

Figure 2A:
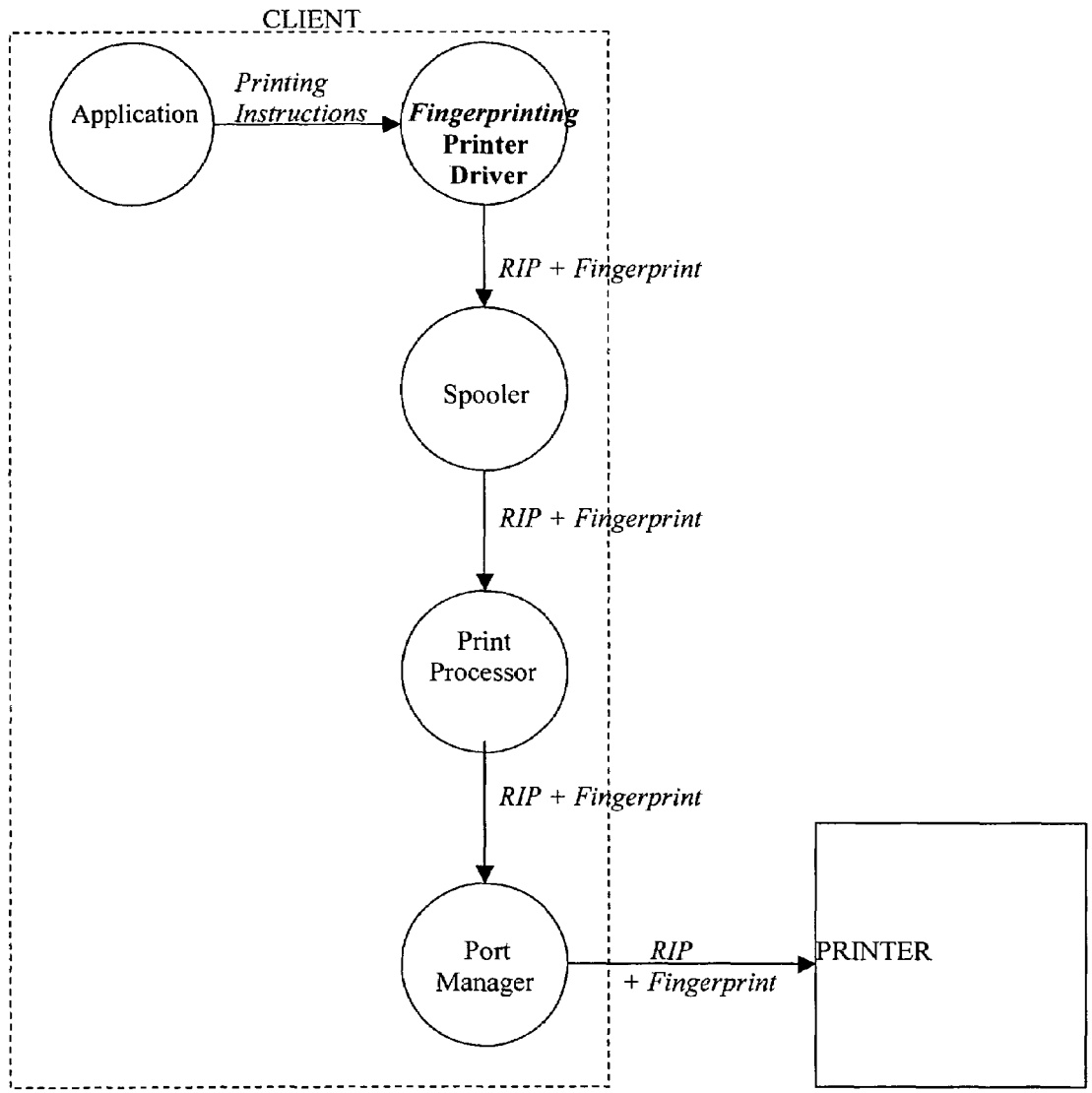
FIG. 2A depicts the introduction of fingerprint information at the print source.

FIG. 2A depicts the introduction of fingerprint information at the print source. The print subsystem, at the source initiating the print job, adds the fingerprint to the print data. For example, the fingerprint may be added by a printer driver, as described in pending application WO0174053.

Figure 2B:
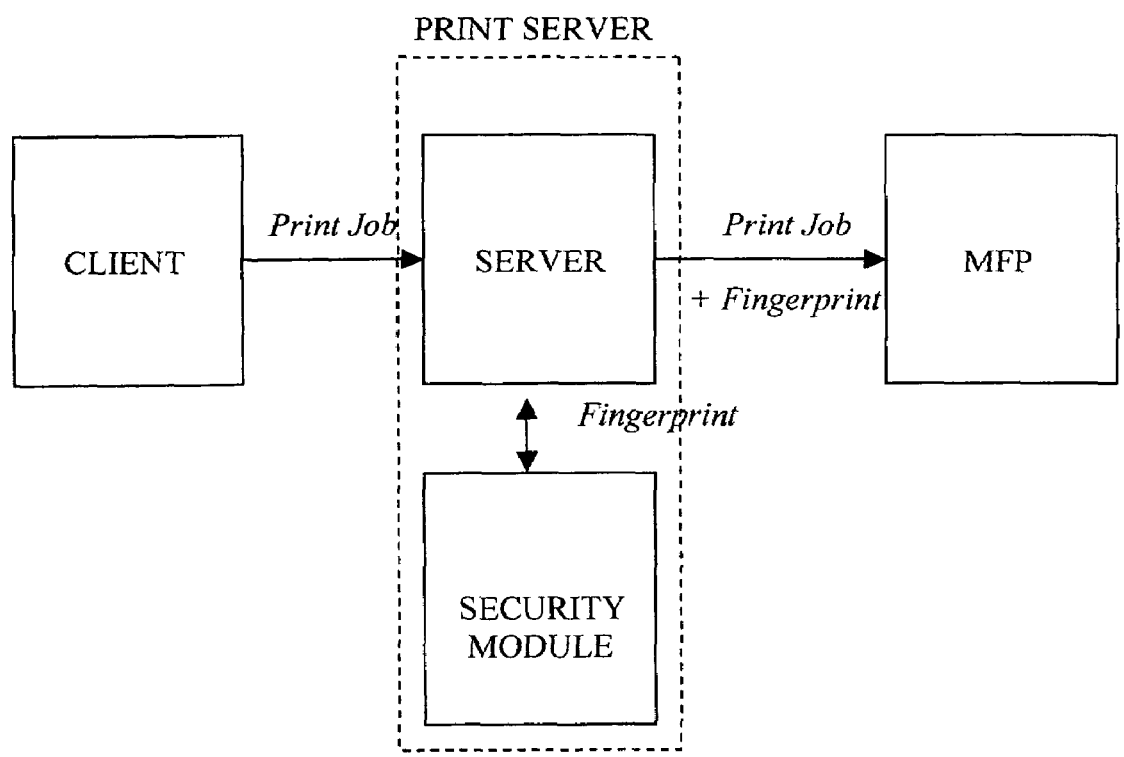
FIG. 2B depicts the introduction of fingerprint information by a dedicated print server security module.

FIG. 2B depicts the introduction of fingerprint information by a dedicated print server security module. The print subsystem, on a print server that manages print jobs to the printing device, performs security functions related to the print job, such as authenticating a user or enforcing printing restrictions. See publication U.S. 20020042884, entitled, REMOTE PRINTING OF SECURE AND/OR AUTHENTICATED DOCUMENTS.

Figure 2C:
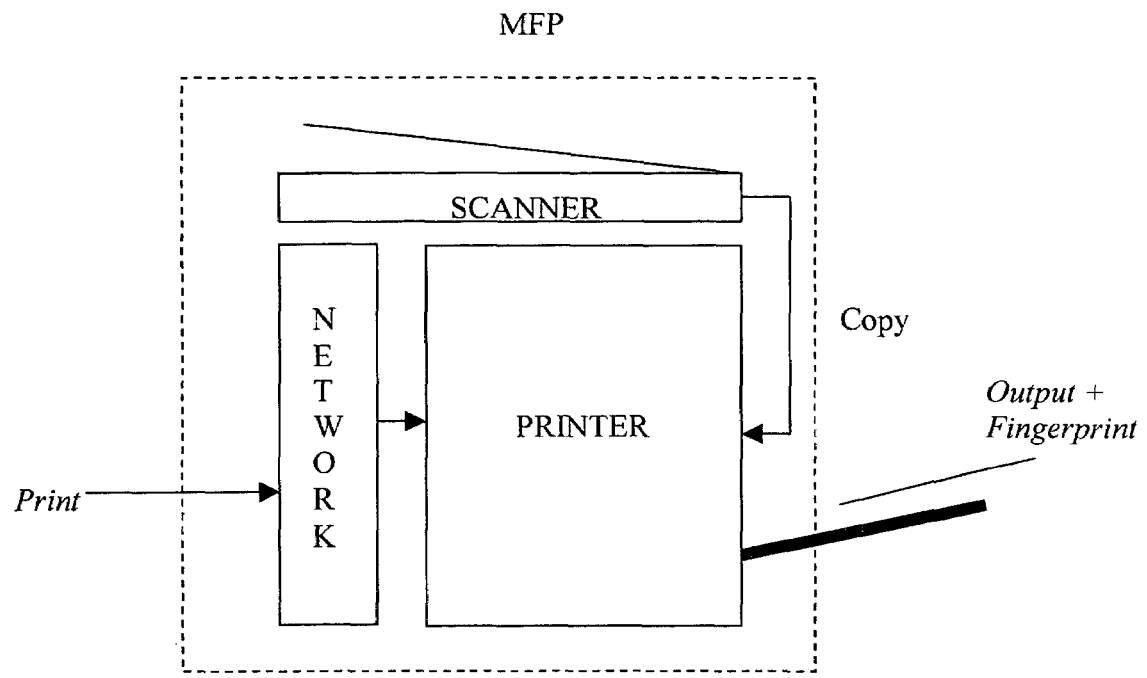
FIG. 2C is a drawing depicting the introduction of a fingerprint by a printer.

FIG. 2C is a drawing depicting the introduction of a fingerprint by a printer. The printer firmware adds the fingerprint to the print data. For example, the fingerprint may be added by a rasterization process.

Figure 3:
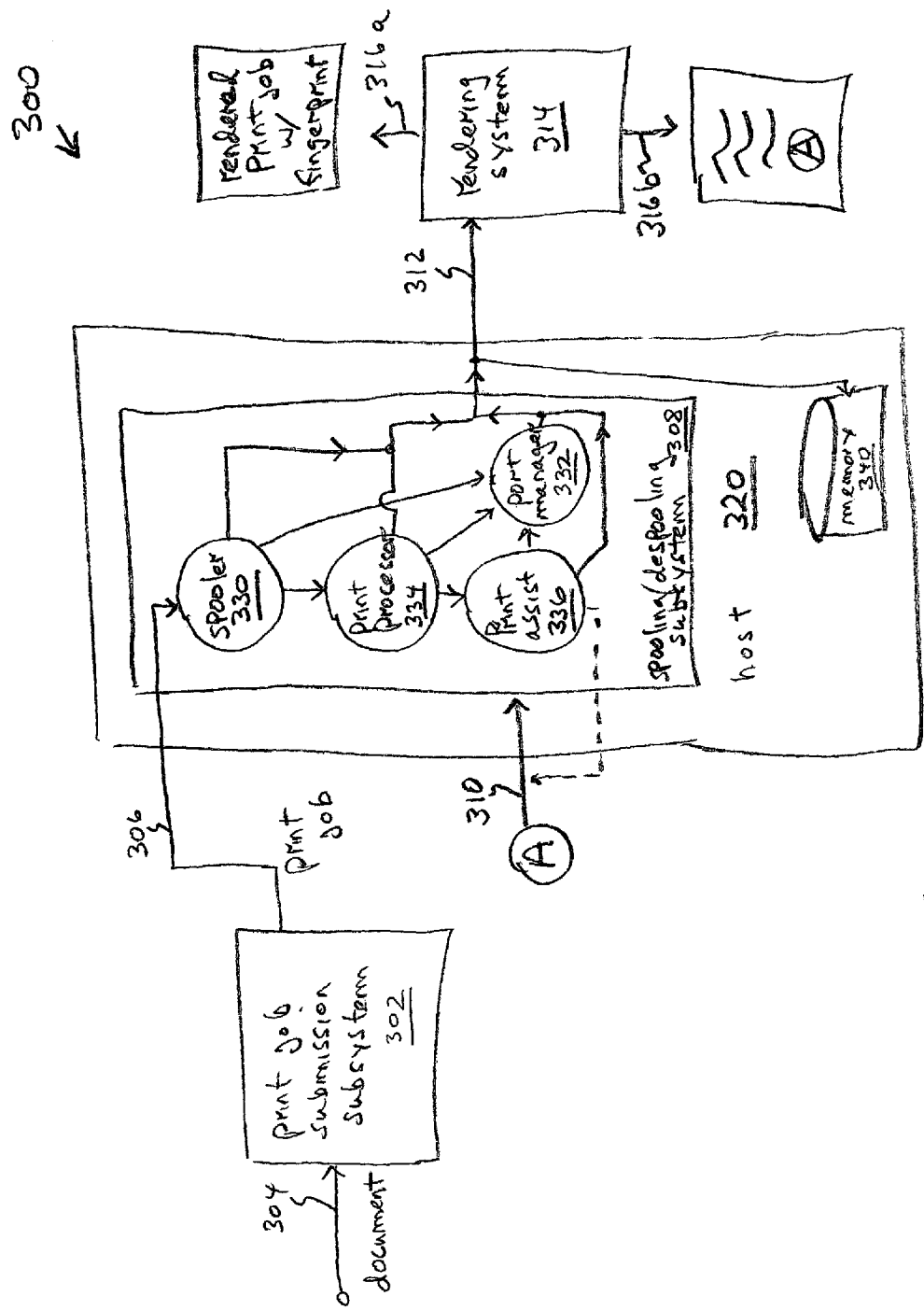
FIG. 3 is a schematic block diagram of the present invention print job fingerprinting system.

FIG. 3 is a schematic block diagram of the present invention print job fingerprinting system. The system 300 comprises a print job submission subsystem 302 having an interface on line 304 to accept an electronically formatted document. For example, in some aspects of the system the print job submission subsystem is a print driver. The print job submission subsystem 302 has an interface on line 306 to supply a generated print job. For example, the print job submission subsystem 302 may generate the print job in a page description language (PDL), such as PostScript or printer control language (PCL), a machine independent bitmap, such as a TIFF file, or printer engine-ready (printer specific) raster data. A spooling/despooling subsystem 308 has an interface on line 310 to accept fingerprint information, represented as a capitalized "A" inside a circle. The spooling/despooling subsystem 308 has an interface on line 306 to accept the print job. The spooling/despooling subsystem 308 adds a fingerprint image to the print job and supplies a fingerprinted print job at an interface on line 312. As used herein, a print job is used to denote any job that renders a soft or hard copy document into another soft or hard copy document. These rendering operations may include printing, copying, scanning, faxing, or document conversion, to name a few examples. Likewise, a printer is any physical or logical device that performs the rendering, such as a printer, copier, scanner, facsimile device, document server, etc.

Generally, a rendering system 314 has an interface on line 312 to accept the fingerprinted print job. The rendering system 314 may be a copier, scanner, printer, facsimile device, document server, or a rendering format converter (any device that converts the format of the print job). The rendering system 314 has an interface on line 316 to supply a rendered print job with the fingerprint image. The above-mentioned rendering system examples supply a rendered print job (with fingerprint image) in either an electronic (soft), on line 316a, or printed (hard) format, on line 316b. Either way, the fingerprint remains with the print job regardless of the rendering type.

For example, the rendering system 314 may be a printer. In that case, the printer 314 has an interface on line 312 to accept the fingerprinted print job from the spooling/despooling subsystem 308. The printer 314 has an output on line 316 to supply a generated hardcopy of the document, with the fingerprint image. As shown, the circle-A fingerprint is superimposed on a printed document. As mentioned above, a printer can be a device that accepts an electronically formatted document and supplies a tangible output such as a paper document. A printer may be a multifunctional peripheral (MFP) device, a fax device, a scanner, or a copier for example.

The spooling/despooling subsystem is embedded in a host 320. The host may be a client computing device, for example a personal computer, a print provider, or a print server. As used herein, a print provider is a system that includes one, or more, print managers connected to a plurality of computers. The print manager allocates jobs to the printer based upon a predetermined distribution algorithm.

The spooling/despooling subsystem 308 may include a spooler 330, a port manager 332, a print processor 334, and/or a print assist 336. Note, not every spooling/despooling subsystem includes all of the above-mentioned components. Also note that the position, or function of the print assist element 336 varies upon usage. The spooling/despooling subsystem 308 adds the fingerprint image to the print job using any one of the spooler 330, port manager 332, print processor 334, or print assist 336 modules.

For example, if the spooling/despooling subsystem 308 accepts fingerprint information at the print processor 334, the print processor 334 accepts a despooled print job from the spooler 330 and adds the fingerprint image to the despooled print job. If the spooler 330 accepts the fingerprint information, the fingerprint may be added prior to despooling the print job, while despooling the print job, or after the print job is despooled. If the port manager 332 accepts fingerprint information, the port manager 332 accepts a despooled print job from the print processor 334 and adds the fingerprint image to the despooled print job.

In one aspect, the spooling/despooling subsystem 308 analyzes the content of the print job and adds a fingerprint image to the print job responsive to the analyzed content information. For example, the print assist 336 may be configured to perform such an analysis. As shown, the results of the analysis (a fingerprint) is being output on a dotted line connected to line 310. Note, the analysis is performed regardless of the print job format.

The spooling/despooling subsystem 308 accepts fingerprint information such as job ownership/origination, host, target printer, routing, job assembly, job scheduling, metadata, and/or job content information. Job ownership/origination fingerprint information includes user name, biometric data, and a digital signature associated with the source of the electronically formatted document. Job scheduling fingerprint information includes job name, job ID, job submission time and date, and job size. Job assembly fingerprint information includes the number of pages/sheets, sheet assembly (duplex, n-up, booklet, tri-fold), finishing (stapling, folding, hole-punching, cutting, trimming), collation (copies, face-up, color separation), rendering (color, dpi, resolution), and consumables (paper stock and ink).

Routing fingerprint information includes print server name, print server queue, print server network address, port name, and print provider. Host fingerprint information includes host name, host machine address (MAC), and host network address, such as an IP address. Target printer fingerprint information includes printer name, printer model name, printer serial number, printer network address. Metadata fingerprint information includes access control and anti-copy protection information. That is, information concerning who has access to see, print, or distribute the print job.

Figure 1C:
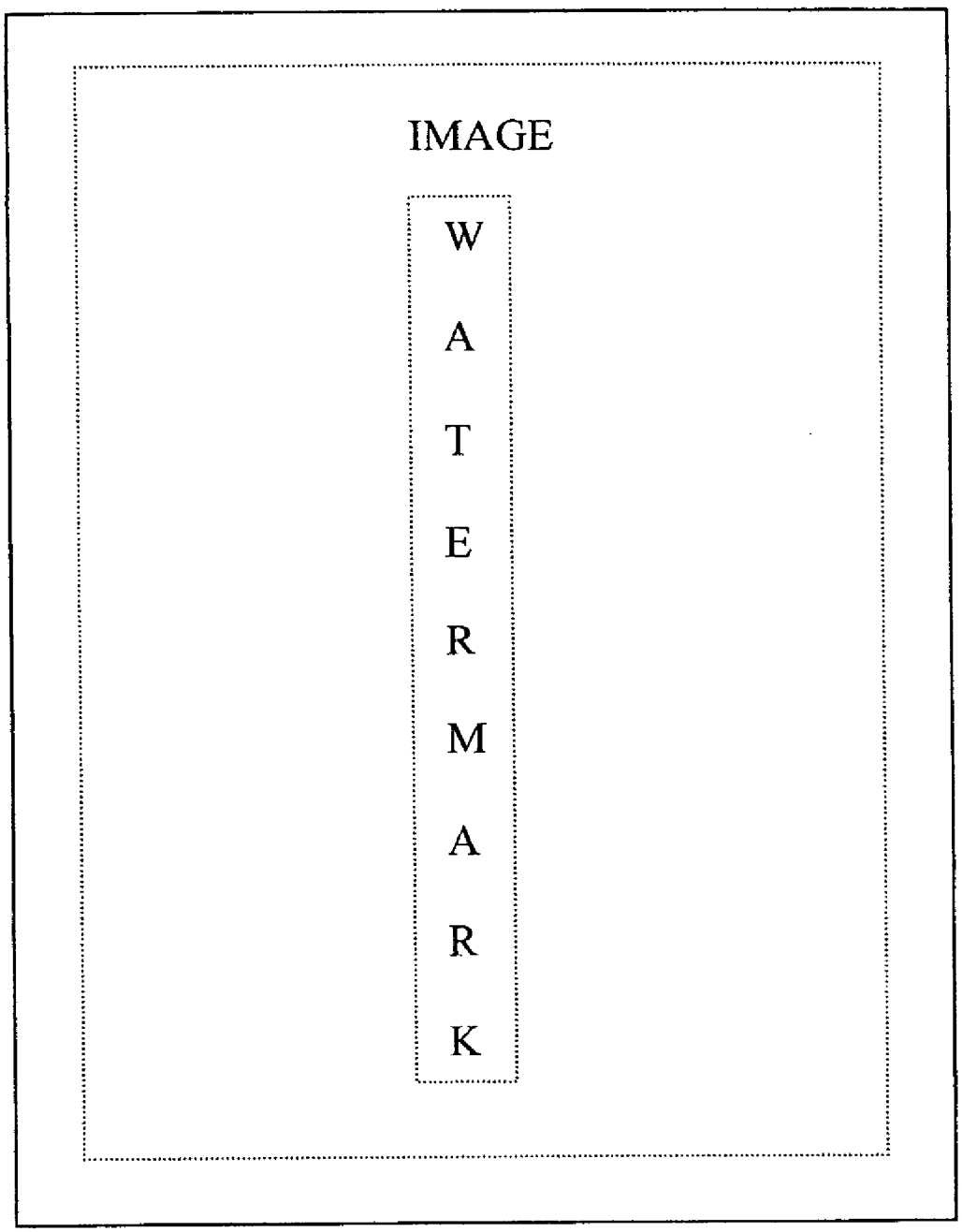
FIG. 1C is a diagram depicting a watermark fingerprint process (prior art).

The spooling/despooling subsystem 308 adds a fingerprint image to the print job in a format such as a barcode, alphanumeric text, watermark, font set, or steganographic image. See FIG. 1A for an example of a barcode fingerprint. A steganographic image is an image that is undetectable to the casual observer.

In one aspect of the system, the spooling/despooling subsystem 308 encrypts the fingerprint information on line 310 and adds an encrypted fingerprint image to the print job. Alternately, the spooling/despooling subsystem 308 accepts encrypted fingerprint information on line 310 and adds an encrypted fingerprint image to the print job. Note, an encrypted fingerprint may be a readily visible image with "scrambled" content, such as coded text. Alternately, an encrypted fingerprint may be a steganographic image, or an image that is distributed in a coded pattern across a page. This "scrambled" image may include uncoded information—information that would be readily understandable if the image could be assembled.

The rendering system 314, for example a printer, accepts the print job with the encrypted fingerprint image on line 312. The rendering system 314 decrypts the fingerprint image and supplies a rendered print job with the decrypted fingerprint image on line 316.

In another aspect of the system, the spooling/despooling subsystem 308 includes a memory 340 for storing and maintaining a record of fingerprinted print jobs.

Functional Description

The present invention fingerprinting process is independent of the means used for initiating the print job, or the means used for transmitting the print job to a printing device. For example, the print job may be generated by a printer driver from an application. The application converts the document into printing instructions, such as GDI (Graphics Device Interface) in the MS family of operating systems. The printing instructions are passed to a printer driver installed on the client and/or server associated with the printing device. The printer driver converts the printing instructions into a printer dependent format, such as a raster image or PDL. In other cases, such as Direct Printing, the document format is directly interpreted by the printer, and there is no preprocessing of the document format into a printer-dependent format.

This invention is also independent of the manner in which the fingerprint is imprinted and/or hidden in the print job. For example, the fingerprint may be added as a barcode in the unprinted binding area of the paper output. The fingerprint information may further be encrypted and/or require authentication to access and/or decrypt.

The fingerprinting information may further be configurable, to include, but not be limited to, the following categories:

1. Job Owner/Origination Information
2. Host Information
3. Print Server Information
4. Printer Information
5. Job Assembly Information
6. Job Content Information
7. Job Scheduling
8. Metadata.

Print Processor

In one aspect of the invention, the print job is spooled to the spooler. The spooler despools the print job to the print processor associated with the selected printing device(s). The print processor then despools the print job to the port manager associated with the printing device, if the print job is rendered, or plays back the print job to the printer driver associated with the installed printer, if the print job is journaled.

During the despooling process, the print processor collects information on the print job origin, print destination device, and intermediate destination devices, such as a print server. The print processor records the information as a fingerprint, by any means, into the print job. The information may be collected prior to despooling the print job, while the print job is despooling, or after the print job is despooled. The fingerprint may also be further secured by encryption or access control.

Print job information may be collected through a variety of means, but not limited to:

1. Parsing the print job.
2. Obtaining information from the job scheduler.
3. Obtaining information from the host device.
4. Obtaining information from the destination device.
5. Obtaining information from an intermediate device.
6. Monitoring the Print Job The information collected may fall into the following categories:

1. Job Owner Information
   a. User Name
   b. Biometric Data
   c. Digital Signature 2. Job Scheduling Information
   a. Job Name
   b. Job ID
   c. Job Submission Date & Time
   d. Job Size
3. Job Assembly Information
   a. Number of Pages/Sheets
   b. Sheet assembly (e.g., duplex, n-up, booklet, tri-fold)
   c. Finishing (e.g., stapling, folding, punching, trimming, cutting)
   d. Collation (e.g., copies, face-up, color separation)
   e. Rendering (e.g., color, dpi, resolution)
   f. Consumables (e.g., paper stock, ink)
4. Job Routing Information
   a. Printer Server Name
   b. Printer Server Queue
   c. Printer Server Network Address
   d. Port Name
   e. Print Provider
5. Host Information
   a. Host Name
   b. Host Network Address
   c. Host Machine Address
6. Printer Information
   a. Printer Name
   b. Printer Model Number
   c. Printer Serial Number
   d. Printer Network Address
7. Metadata
   a. Access Control
   b. Anti-Copy Protection The fingerprinting print processor can be hosted on a client computing device and/or server computing device, in the case of network printing.

Figure 4A:
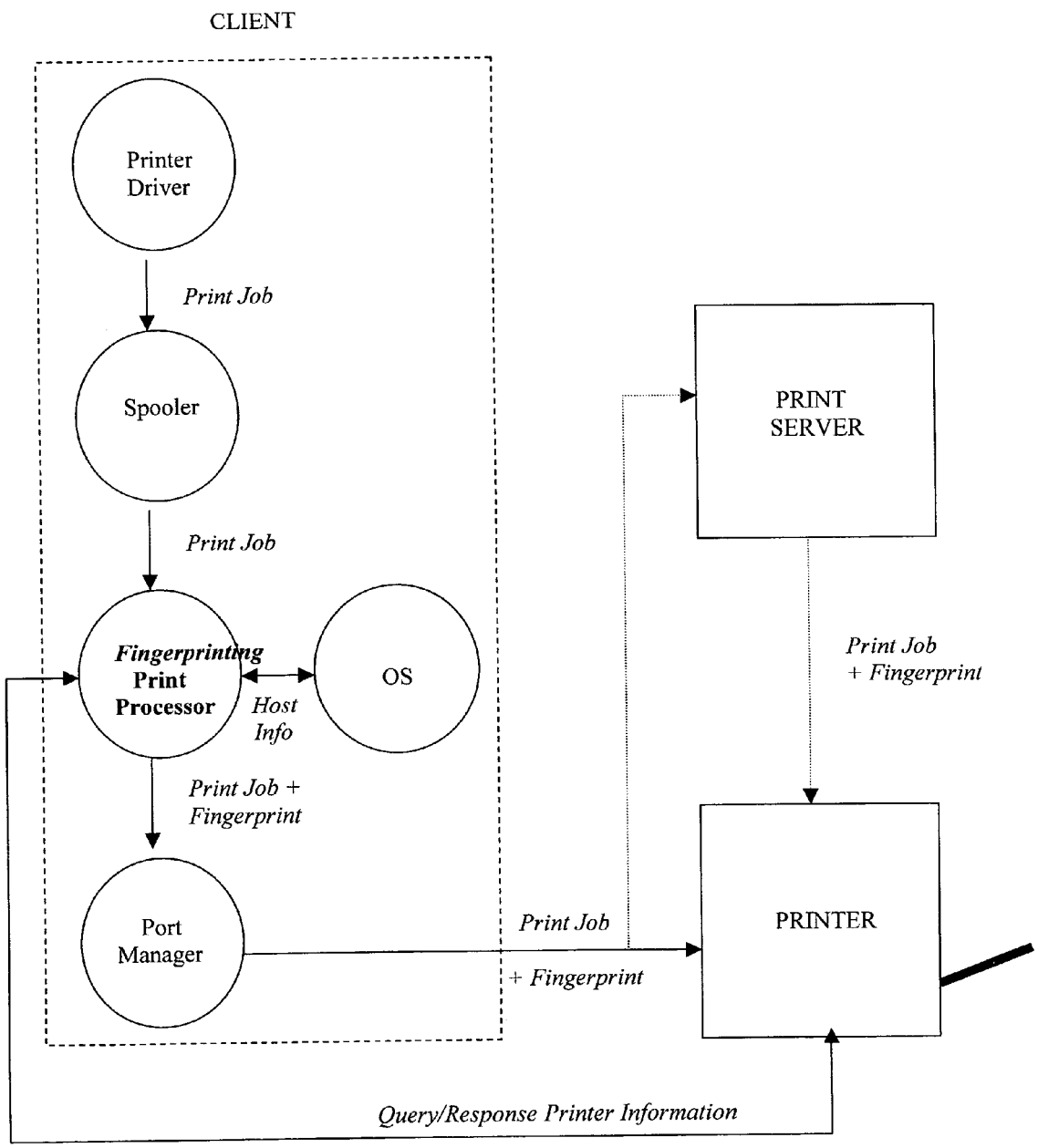
FIG. 4A is a drawing depicting the fingerprinting print process embedded in a client computing device.

FIG. 4A is a drawing depicting the fingerprinting print process embedded in a client computing device. In this example, the fingerprinting print processor obtains information from:

The client operating system—collecting information about the client device, such as client name, host machine address, or network address.

The spooler—collecting information about the job, such as print queue, document name, document format type, user id, submit date & time, or job size.

The printer firmware—collecting information about the printing device, such as serial number, printer name, printer model, or network address.

The print server, if any, collecting information about the server device, such as such as server print queue, server name, host machine address, or network address.

Figure 4B:
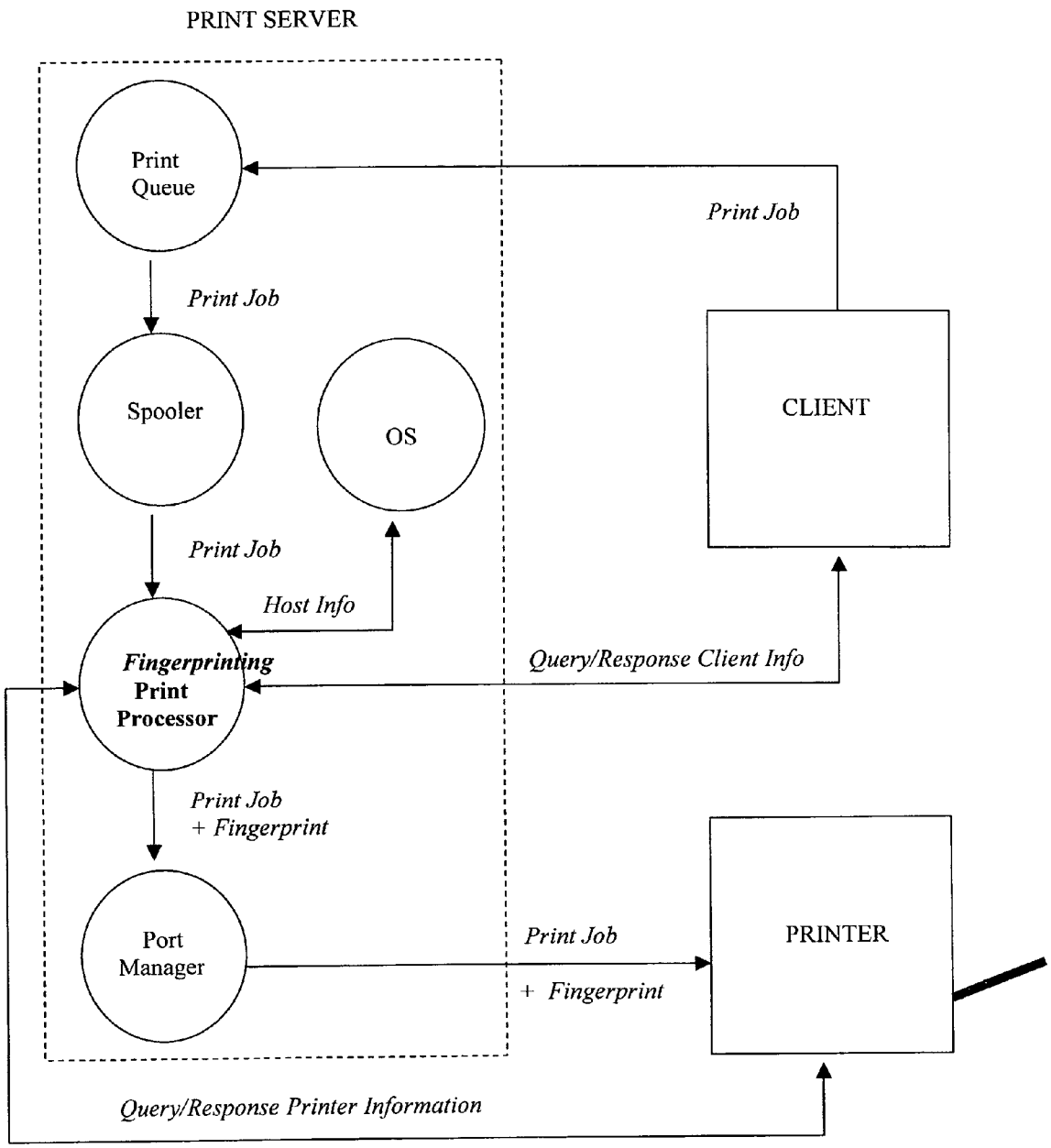
FIG. 4B is a drawing depicting the fingerprinting print processor embedded in a print server computing device.

FIG. 4B is a drawing depicting the fingerprinting print processor embedded in a print server computing device. In this example, the fingerprinting print processor obtains information from:

The server operating system—collecting information about the server device, such as server name, server print queue, server machine address, or network address.

The spooler—collecting information about the job, such as print queue, job name, user id, submission date & time, or job size.

The printer firmware—collecting information about the printing device, such as serial number, printer name, printer model or network address.

The client—collecting information about the client device, such as serial number, printer name, printer model, or network address.

Spooler

In this aspect of the invention, the fingerprinting functions are performed by the print spooler. The spooler collects information concerning the print job origin, print destination device, and intermediate destination devices, such as a print server. The spooler records the information as a fingerprint in the print job. The information may be collected prior to despooling the print job, while the print job is despooling, or after the print job is despooled.

This aspect of the invention is advantageous when the spooler despools the print job directly to the printing device, without the use of a print processor. For example, the 'print directly to printer' spooler option in the Microsoft family of operating systems.

Figure 5A:
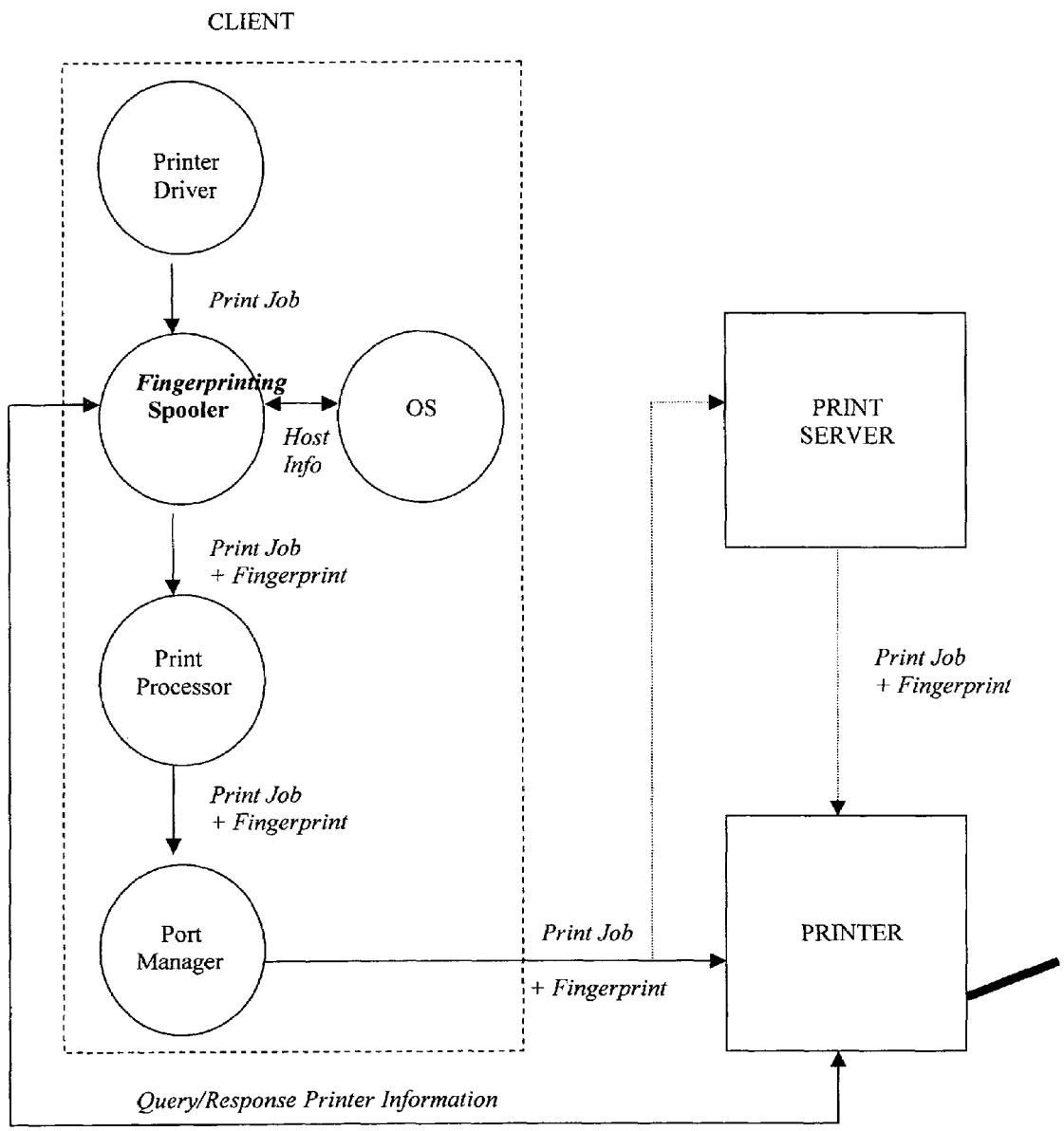
FIGS. 5A and 5B are drawings depicting the fingerprinting spooler embedded in client and print server computing devices, respectively.
Figure 5B:
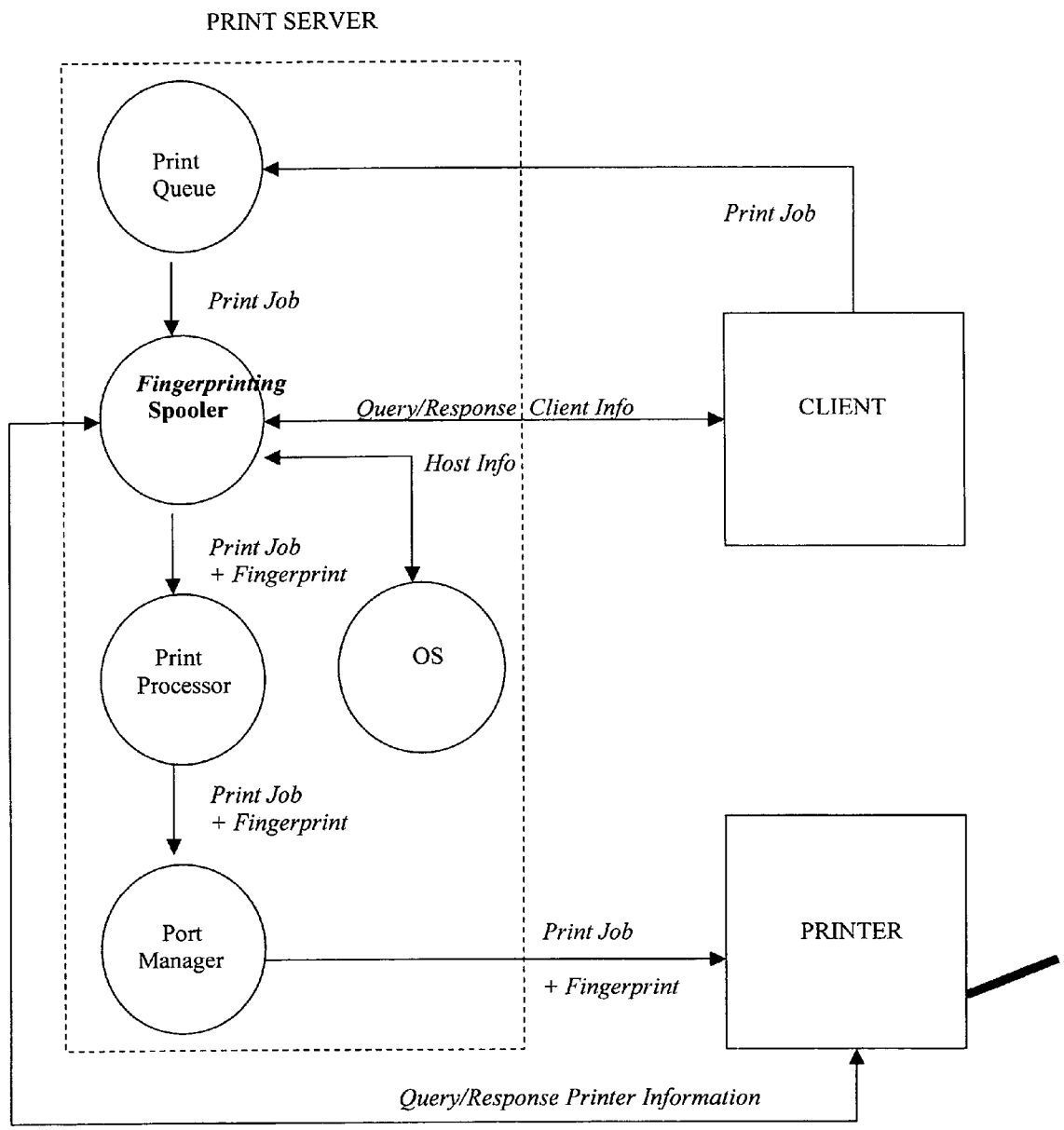

FIGS. 5A and 5B are drawings depicting the fingerprinting spooler embedded in client and print server computing devices, respectively.

Print Assist

In this aspect, the fingerprinting functions are performed by a print assist. The print assist is any component added to the print subsystem between the print source origination, for example, a print driver, and a port manager. The print assist has the advantage of integrating into an existing print subsystem without the need to replace any existing components, such as a spooler or print processor.

Figure 6A:
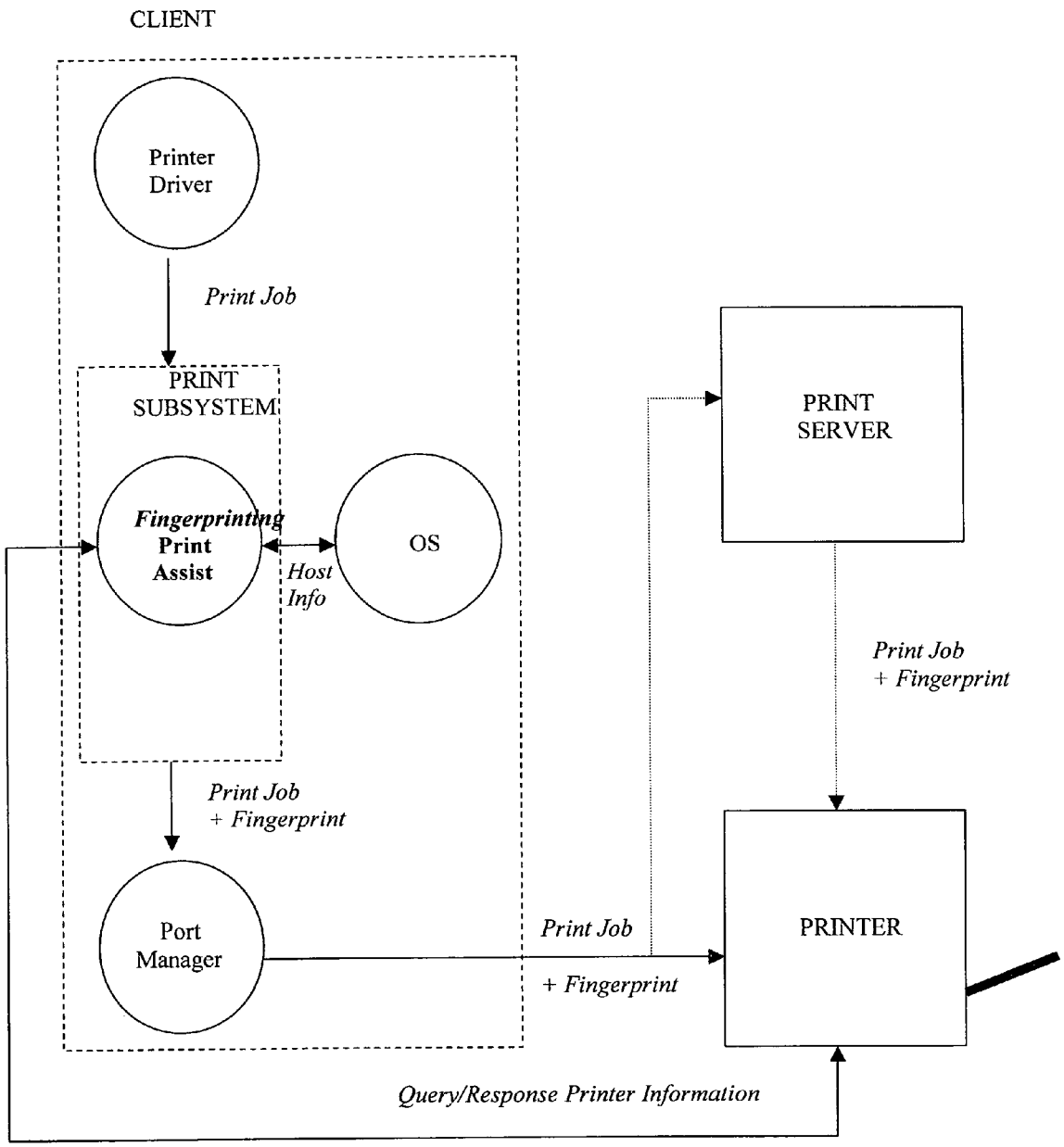
FIGS. 6A and 6B are drawings depicting a fingerprinting print assist embedded in client and print server computing devices, respectively.
Figure 6B:
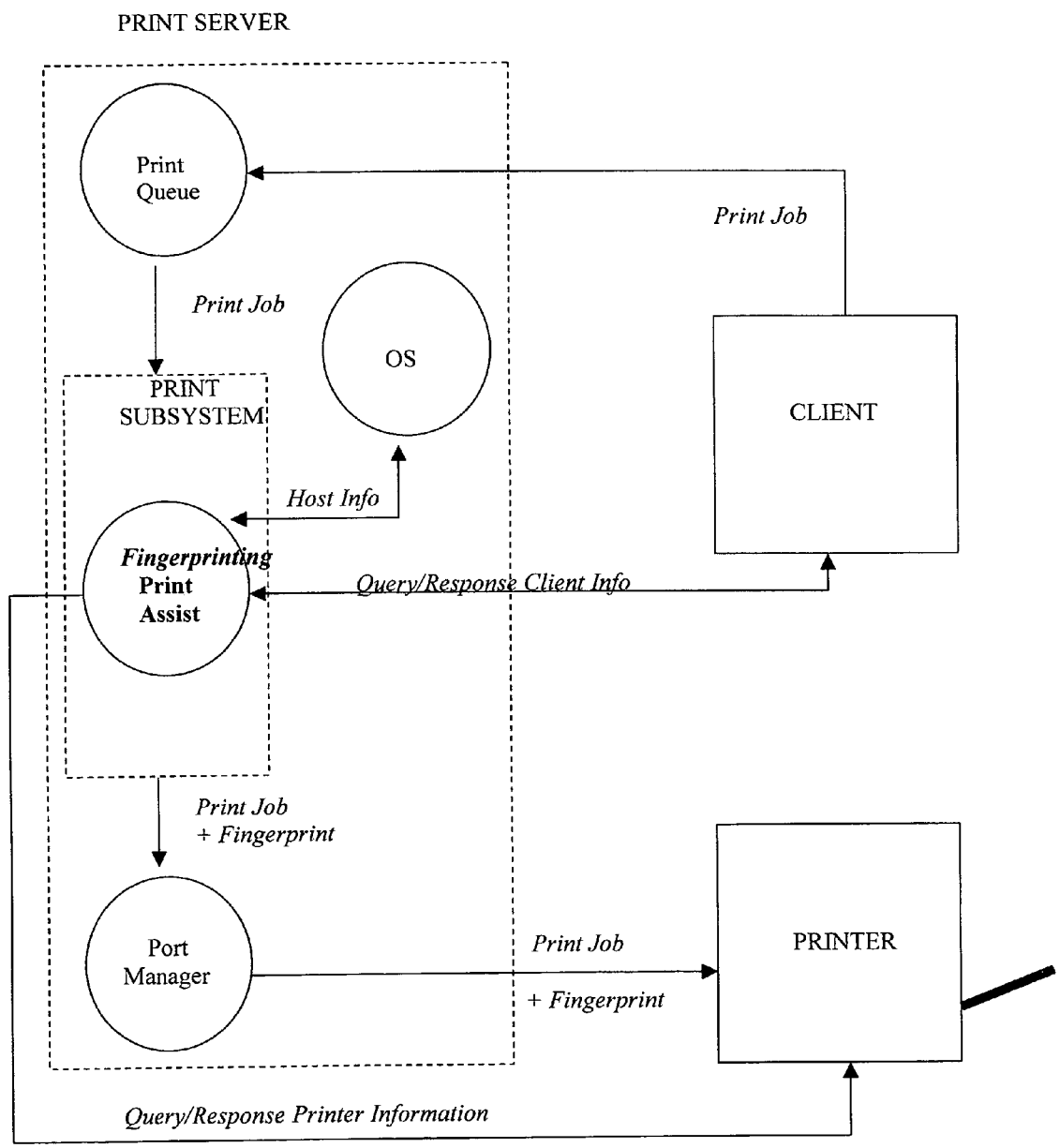

FIGS. 6A and 6B are drawings depicting a fingerprinting print assist embedded in client and print server computing devices, respectively.

Configuration

Figure 7A:
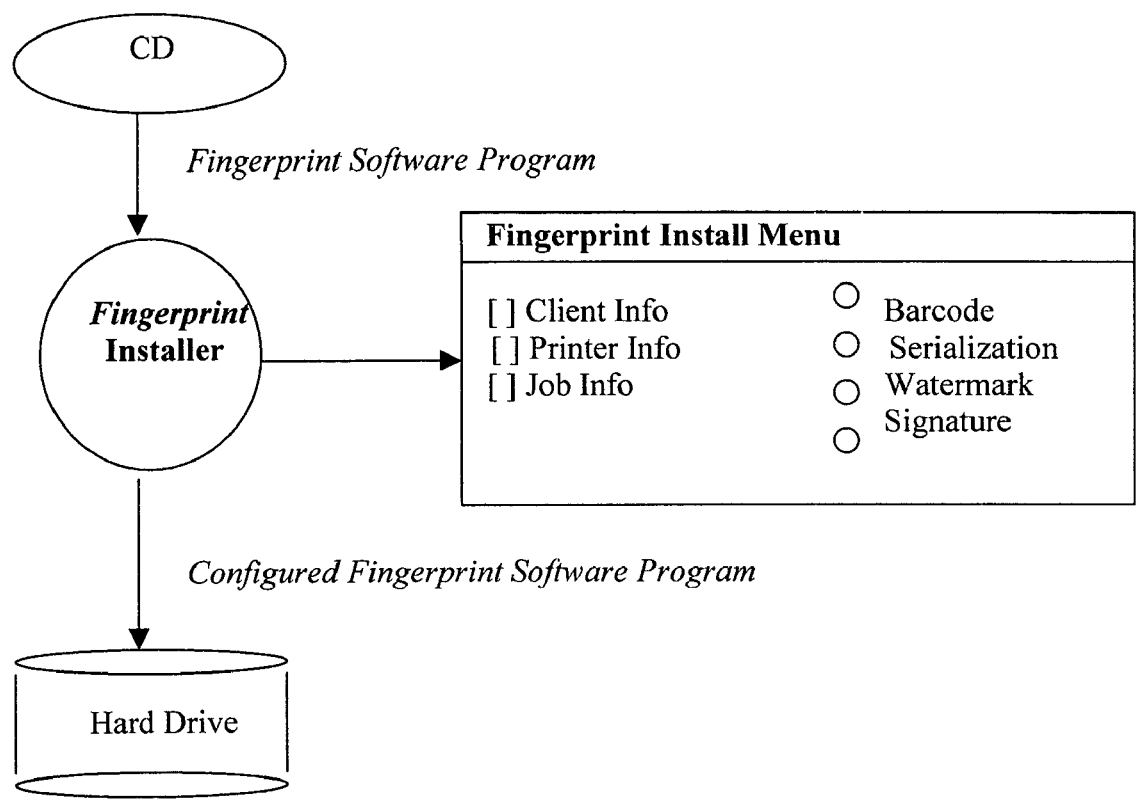
FIG. 7A is a drawing depicting the fingerprint system configuration by a user.

FIG. 7A is a drawing depicting the fingerprint system configuration by a user. The fingerprint information collection process may be configurable, such as, but not limited to, during installation by the user. The installer may present the user/administrator with options relating to fingerprinting, including the information to be fingerprinted, such as the host name, and the fingerprint image type, such as a barcode.

Figure 7B:
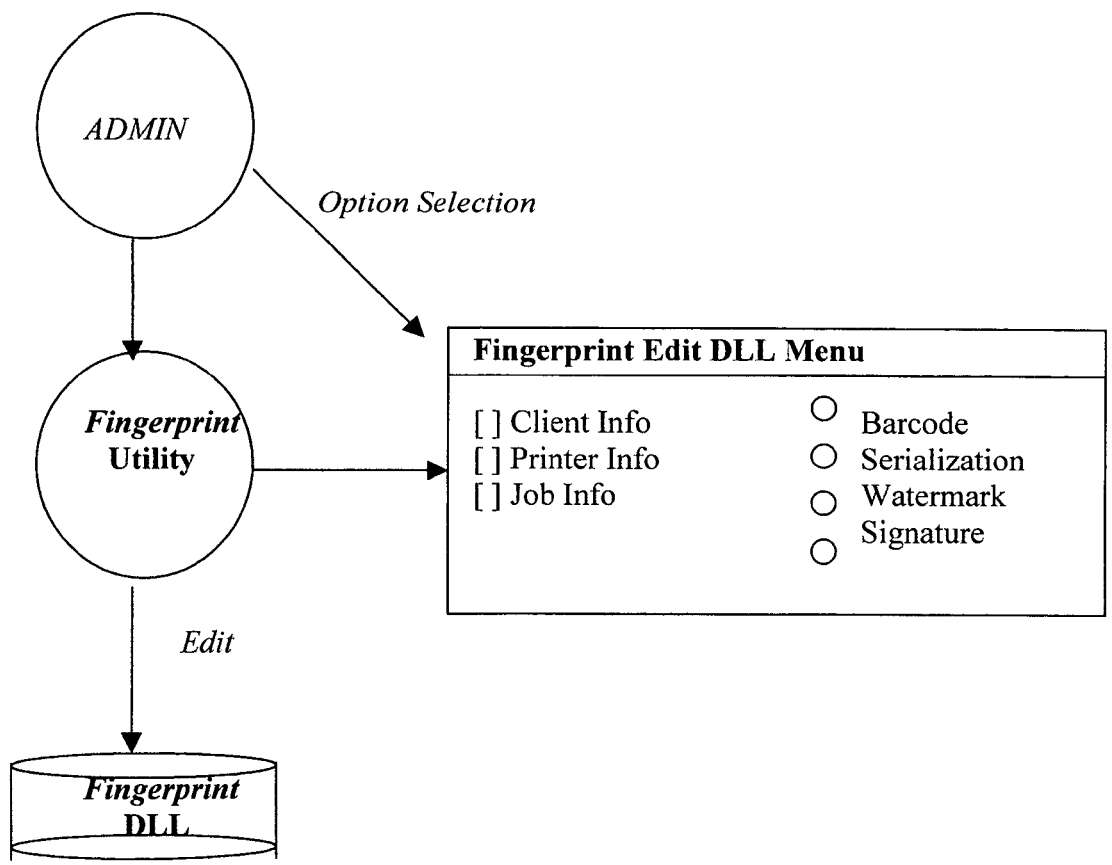
FIG. 7B is a drawing depicting the fingerprint system configuration by an administrator.

FIG. 7B is a drawing depicting the fingerprint system configuration by an administrator. The administrator may pre-configure the installation by using a utility to construct or edit a binary file that contains the configuration settings and becomes part of the process, such as using an executable dynamic link library.

Figure 7C:
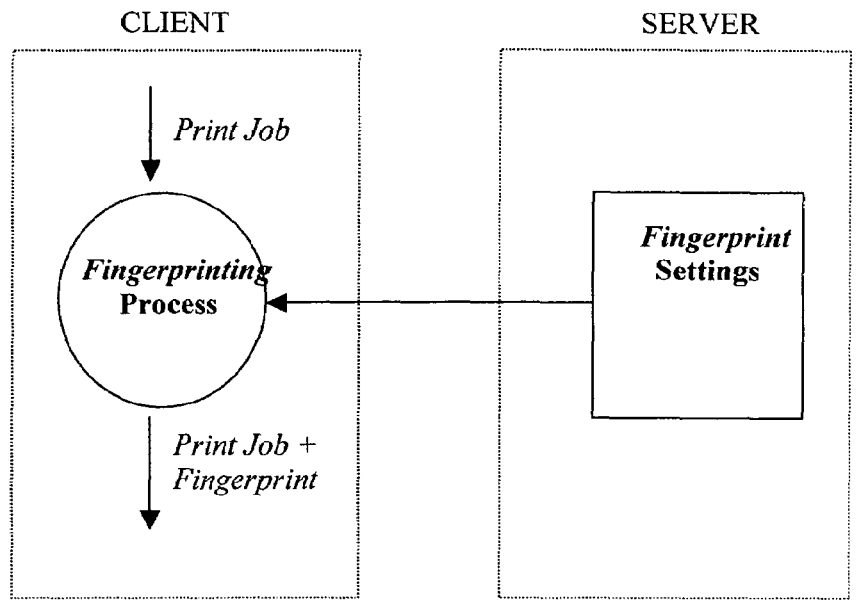
FIG. 7C is a drawing depicting the fingerprint system configuration by an external interface.

FIG. 7C is a drawing depicting the fingerprint system configuration by an external interface. The fingerprint process may read a configuration/settings file from a predetermined place on the network.

Figure 7D:
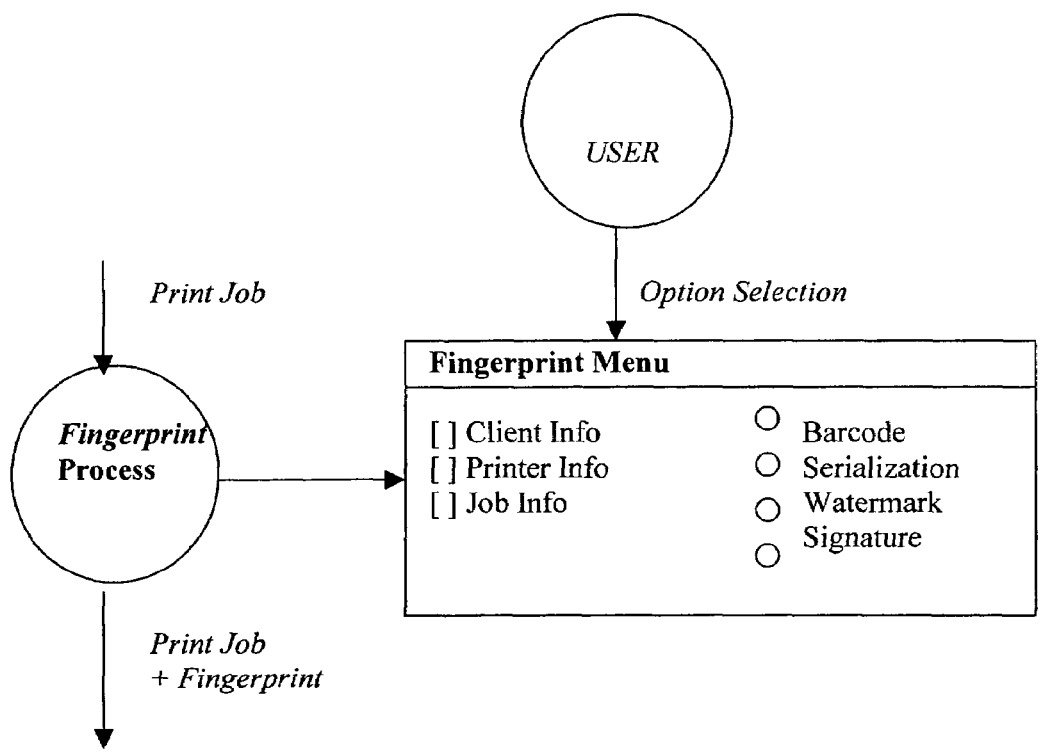
FIG. 7D is a drawing depicting the fingerprint system configuration by a user interface.

FIG. 7D is a drawing depicting the fingerprint system configuration by a user interface. For example, the system can be configured before run-time by the user through a user interface. The fingerprint process may display a user interface at run-time to the user, whereby the user selects the fingerprinting options.

Figure 8:
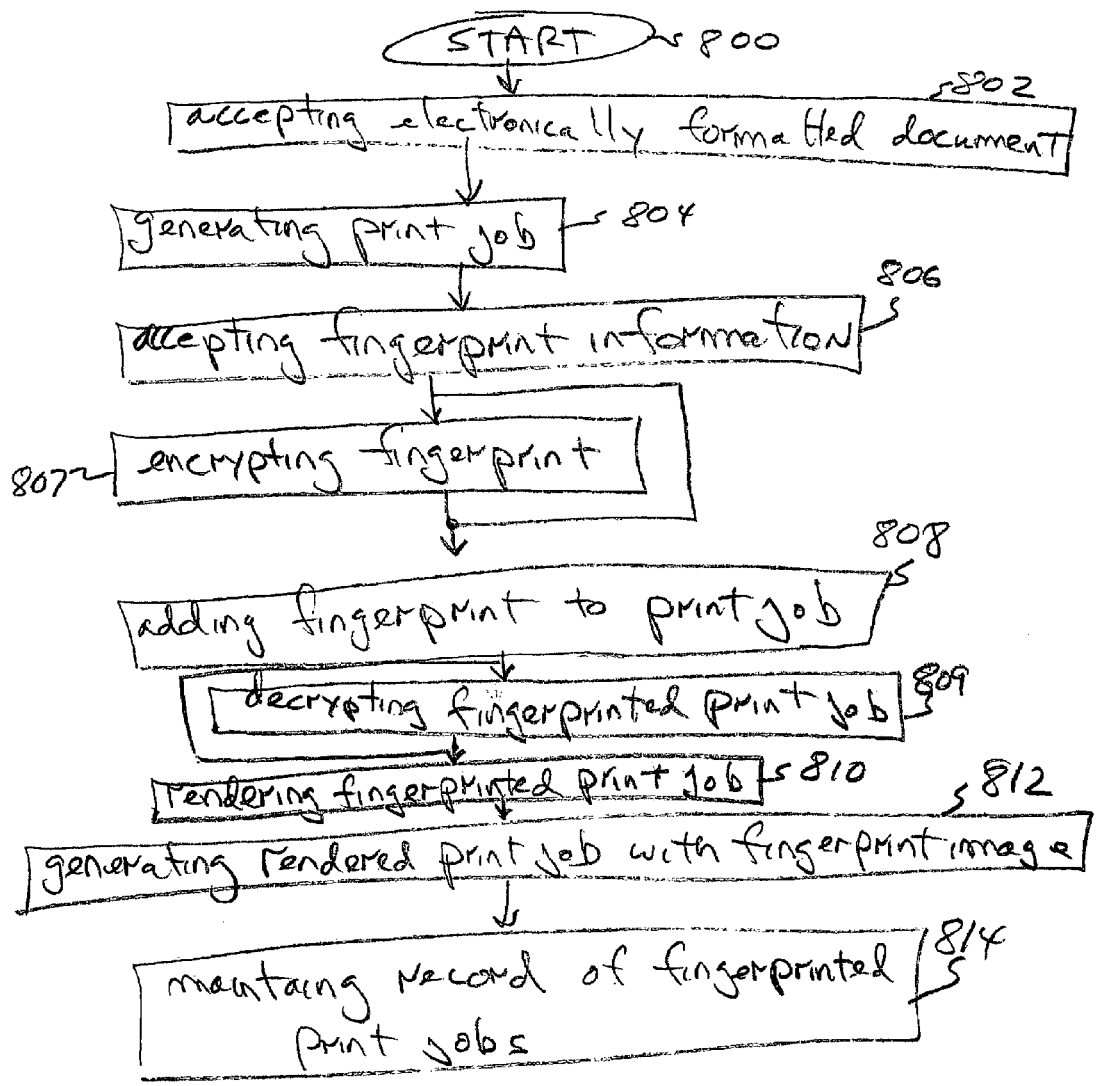
FIG. 8 is a flowchart illustrating the present invention method for print job fingerprinting.

FIG. 8 is a flowchart illustrating the present invention method for print job fingerprinting. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 accepts an electronically formatted document. Step 804 generates a print job. For example, Step 804 may generate a print job in a format such as a machine-dependent raster image data, machine independent bitmap data, or a page description language (PDL). Step 806 in a spooling/ despooling subsystem, accepts fingerprint information. Step 808 adds a fingerprint image to the print job, generating a fingerprinted print job.

Step 810, subsequent to generating the fingerprinted print job, renders the fingerprinted print job using a process such as copying, scanning, or converting the print job format. Step 812 generates a rendered print job with the fingerprint image. For example, in one aspect Step 810 sends the fingerprinted print job, from the spooling/despooling subsystem, to a printer. Then, Step 812 generates a hardcopy of the document, with the fingerprint image. Optionally, Step 814, in the spooling/despooling subsystem, maintains a record of fingerprinted print jobs.

In one aspect, accepting fingerprint information in Step 806 includes accepting the fingerprint information in a spooling/despooling subsystem embedded in a host such as a client computing device, print provider, or a print server. In a different aspect, Step 806 accepts fingerprint information selected from the group including job ownership/origination, host, target printer, routing, job assembly, job scheduling, metadata, and job content information.

For example, job ownership/origination fingerprint information may include user name, biometric data, or a digital signature associated with the electronically formatted document source. Job scheduling fingerprint information may include job name, job ID, job submission time and date, document name, document format type, or job size. Job assembly fingerprint information may include the number of pages/sheets, sheet assembly (duplex, n-up, booklet, tri-fold), finishing (stapling, folding, hole-punching, cutting, trimming), collation (copies, face-up, color separation), rendering (color, dpi, resolution), and consumables (paper stock and ink).

Routing fingerprint information may include print server name, print server machine address, print server queue, print server network address, port name, or print provider. Host fingerprint information may include host name, host machine address (MAC), or host network address. Target printer fingerprint information may include printer name, printer model name, printer serial number, or printer network address. Metadata fingerprint information may include access control or anti-copy protection information.

In another aspect, accepting fingerprint information in Step 806 includes substeps (not shown). Step 806*a* analyzes content information from the print job. Step 806*b* generates a fingerprint in response to the print job content information analysis.

In another aspect, adding a fingerprint image to the print job in Step 808 includes adding the fingerprint image to the print job using a spooling/despooling subsystem component such as a spooler, port manager, print processor, or print assist module.

If Step 806 accepts the fingerprint information at a print processor, then Step 808 adds a fingerprint image to the print job by accepting a despooled print job, and adding the fingerprint image to the despooled print job.

If Step 806 accepts fingerprint information at a spooler, Step 808 adds the fingerprint image using a process such as: adding the fingerprint prior to despooling the print job; adding the fingerprint while despooling the print job; or, adding the fingerprint after the print job is despooled.

In one aspect, Step 808 adds a fingerprint image to the print job in a format such as a barcode, alpha-numeric text, watermark, font set, or a steganographic image.

In a different aspect, a further step, Step 807 encrypts the fingerprint information. Then, generating a fingerprinted print job in Step 808 includes adding an encrypted fingerprint image to the print job. Alternately, Step 806 accepts encrypted fingerprint information and Step 808 adds an encrypted fingerprint image to the print job. Step 809, subsequent to generating the fingerprinted print job, decrypts the fingerprint image (at a rendering device such as a printer). Then, Step 812 generates a rendered print job with the decrypted fingerprint image.

A system and method for fingerprinting a print job have been presented. Examples of processing modules and specifically ordered process steps have been used to clarify the invention. However, the invention is not limited to merely the examples. Other variations and embodiments of the invention will occur to those skilled in the art.

I claim:

1. A method for print job fingerprinting, the method comprising:
   accepting an electronically formatted document;
   generating a print job;
   in a spooling/despooling subsystem embedded in a host selected from the group including a client computing device, print provider, and a print server, accepting job ownership/origination fingerprint information selected from a group consisting of user name, biometric data, and a digital signature associated with the electronically formatted document source;
   adding a fingerprint image to the print job using a spooling/despooling subsystem component selected from the group including a spooler, port manager, print processor, and print assist module, generating a fingerprinted print job;
   sending the fingerprinted print job from the spooling/despooling subsystem to a printer; and,
   generating a hardcopy of the document with the fingerprint image.

2. The method of claim 1 wherein accepting fingerprint information includes accepting job scheduling information selected from the group including job name, job ID, job submission time and date, and job size.

3. The method of claim 1 wherein accepting fingerprint information includes accepting job assembly information selected from the group including the number of pages/sheets, sheet assembly (duplex, n-up, booklet, tri-fold), finishing (stapling, folding, hole-punching, cutting, trimming), collation (copies, face-up, color separation), rendering (color, dpi, resolution), and consumables (paper stock and ink).

4. The method of claim 1 wherein accepting fingerprint information includes accepting routing information selected from the group including print server name, print server queue, print server network address, port name, and print provider.

5. The method of claim 1 wherein accepting fingerprint information includes accepting host information selected from the group including host name, host machine address (MAC), and host network address.

6. The method of claim 1 wherein accepting printer fingerprint information includes accepting target information selected from the group including printer name, printer model name, printer serial number, and printer network address.

7. The method of claim 1 wherein accepting fingerprint information includes accepting metadata information selected from the group including access control and anti-copy protection information.

8. The method of claim 1 wherein accepting fingerprint information includes accepting the fingerprint information at a print processor;
   wherein adding a fingerprint image to the print job includes:

accepting a despooled print job; and,
adding the fingerprint image to the despooled print job.

9. The method of claim 1 wherein accepting fingerprint information includes accepting the fingerprint information at a spooler;
wherein adding a fingerprint image to the print job includes adding the fingerprint image using a process selected from the group including:
adding the fingerprint prior to despooling the print job;
adding the fingerprint while despooling the print job; and,
adding the fingerprint after the print job is despooled.

10. The method of claim 1 wherein adding a fingerprint image to the print job includes adding an image in a format selected from the group including a barcode, alpha-numeric text, watermark, font set, and steganographic image.

11. The method of claim 1 wherein generating a print job includes generating a print job in a format selected from the group including machine-dependent raster image data, machine independent bitmap data, and page description language (PDL).

12. The method of claim 11 wherein accepting fingerprint information includes:
analyzing content information from the print job; and,
generating a fingerprint in response to the print job content information analysis.

13. The method of claim 1 further comprising:
encrypting the fingerprint information; and,
wherein generating a fingerprinted print job includes adding an encrypted fingerprint image to the print job.

14. The method of claim 1 further comprising:
subsequent to generating the fingerprinted print job, rendering the fingerprinted print job using a process selected from the, group including copying, scanning, and converting the print job format; and,
generating a rendered print job with the fingerprint image.

15. The method of claim 1 further comprising:
in the spooling/despooling subsystem, maintaining a record of fingerprinted print jobs.

16. The method of claim 1 wherein accepting fingerprint information includes accepting encrypted fingerprint information; and,
wherein generating a fingerprinted print job includes adding an encrypted fingerprint image to the print job.

17. The method of claim 16 further comprising:
subsequent to generating the fingerprinted print job, decrypting the fingerprint image; and,
generating a rendered print job with the decrypted fingerprint image.

18. A print job fingerprinting system, the system comprising:
a print job submission subsystem having an interface to accept an electronically formatted document and an interface to supply a generated print job;
a spooling/despooling subsystem, including a spooler, a port manager, a print processor, and a print assist, embedded in a host selected from the group including the client computing device, print provider, and print server, having an interface to accept fingerprint information and an interface to accept the print job, the spooling/despooling subsystem adding a fingerprint image to the print job and supplying a fingerprinted print job at an interface;
a printer having an interface to accept the fingerprinted print job from the spooling/despooling subsystem, the printer having an output to supply a generated hardcopy of the document, with the fingerprint image;
a client computing device;
a print provider;
a print server; and,
wherein the spooling/despooling subsystem adds the fingerprint image to the print job using a spooling/despooling subsystem component selected from the group including the spooler, port manager, print processor, and print assist module.

19. The system of claim 18 wherein the spooling/despooling subsystem accepts fingerprint information selected from the group including job ownership/origination, host, target printer, routing, job assembly, job scheduling, metadata, and job content information.

20. The system of claim 19 wherein the spooling/despooling subsystem accepts job ownership/origination fingerprint information selected from the group including user name, biometric data, and a digital signature associated with the source of the electronically formatted document.

21. The system of claim 20 wherein the spooling/despooling subsystem accepts job scheduling fingerprint information selected from the group including job name, job ID, job submission time and date; and job size.

22. The system of claim 19 wherein the spooling/despooling subsystem accepts job assembly fingerprint information selected from the group including the number of pages/sheets, sheet assembly (duplex, n-up, booklet, tri-fold), finishing (stapling, folding, hole-punching, cutting, trimming), collation (copies, face-up, color separation), rendering (color, dpi, resolution), and consumables (paper stock and ink).

23. The system of claim 19 wherein the spooling/despooling subsystem accepts routing fingerprint information selected from the group including print server name, print server queue, print server network address, port name; and print provider.

24. The system of claim 19 wherein the spooling/despooling subsystem accepts host fingerprint information selected from the group including host name, host machine address (MAC), and host network address.

25. The system of claim 19 wherein the spooling/despooling subsystem accepts target printer fingerprint information selected from the group including printer name, printer model name, printer serial number, printer network address.

26. The system of claim 19 wherein the spooling/despooling subsystem accepts metadata fingerprint information selected from the group including access control and anti-copy protection information.

27. The system of claim 19 wherein the spooling/despooling subsystem accepts fingerprint information at the print processor; and,
wherein the print processor accepts a despooled print job from the spooler and adds the fingerprint image to the despooled print job.

28. The system of claim 19 wherein the spooling/despooling subsystem accepts fingerprint information at the spooler; and,
wherein the spooler adds a fingerprint image to the print job includes using a process selected from the group including:
adding the fingerprint prior to despooling the print job;
adding the fingerprint while despooling the print job; and,
adding the fingerprint after the print job is despooled.

29. The system of claim 19 wherein the spooling/despooling subsystem accepts fingerprint information at the port manager; and,
wherein the port manager accepts a despooled print job from the print processor and adds the fingerprint image to the despooled print job.

30. The system of claim 19 wherein the spooling/despooling subsystem adds a fingerprint image to the print job in a format selected from the group including a barcode, alphanumeric text, watermark, font set, and steganographic image.

31. The system of claim 19 wherein the print job submission subsystem generates a print job in a format selected from the group including page description language (PDL), machine independent bitmaps, and printer engine-ready raster data.

32. The system of claim 31 wherein the spooling/despooling subsystem analyzes the content of the print job and adds a fingerprint image to the print job responsive to the analyzed content information.

33. The system of claim 18 wherein the spooling/despooling subsystem encrypts the fingerprint information and adds an encrypted fingerprint image to the print job.

34. The system of claim 18 further comprising:
  a rendering system selected from the group including a copier, scanner, printer, facsimile device, document server, and rendering format converter, having an interface to accept the fingerprinted print job and, an interface to supply a rendered print job with the fingerprint image.

35. The system of claim 18 wherein the spooling/despooling subsystem includes a memory for storing and maintaining a record of fingerprinted print jobs.

36. The system of claim 18 wherein the spooling/despooling subsystem accepts encrypted fingerprint information and adds an encrypted fingerprint image to the print job.

37. The system of claim 36 further comprising:
  a rendering system having an interface to accept the print job with the encrypted fingerprint image, the rendering system decrypting the fingerprint image and supplying a rendered print job with the decrypted fingerprint image.

38. A method for print job fingerprinting, the method comprising:
  accepting an electronically formatted document;
  generating a print job;
  in a spooling/despooling subsystem embedded in a host selected from the group including a client computing device, print provider, and a print server, accepting host fingerprint information selected from the group including host name, host machine address (MAC), and host network address;
  adding a fingerprint image to the print job using a spooling/despooling subsystem component selected from the group including a spooler, port manager, print processor, and print assist module, generating a fingerprinted print job;
  sending the fingerprinted print job from the spooling/despooling subsystem to a printer; and,
  generating a hardcopy of the document with the fingerprint image.

* * * * *